United States Patent
Balakrishnan et al.

(10) Patent No.: US 10,484,224 B2
(45) Date of Patent: *Nov. 19, 2019

(54) PEAK-TO-AVERAGE POWER REDUCTION USING GUARD TONE FILTERING

(71) Applicant: Texas Instruments Incorporated, Dallas, TX (US)

(72) Inventors: Jaiganesh Balakrishnan, Bangalore (IN); Sarma Sundareswara Gunturi, Bangalore (IN); Pankaj Gupta, Dausa (IN); Indu Prathapan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,614

(22) Filed: Apr. 2, 2018

(65) Prior Publication Data
US 2018/0227157 A1 Aug. 9, 2018

Related U.S. Application Data

(63) Continuation of application No. 15/426,464, filed on Feb. 7, 2017, now Pat. No. 9,967,123.

(51) Int. Cl.
*H04L 27/26* (2006.01)

(52) U.S. Cl.
CPC .............. *H04L 27/2624* (2013.01)

(58) Field of Classification Search
CPC .......... H04L 27/2623; H04L 27/2615; H04L 1/0065; H04L 1/0057; H04L 2025/03414;
(Continued)

(56) References Cited

U.S. PATENT DOCUMENTS

| 7,187,722 B2 | 3/2007 | Peeters |
| 8,098,744 B2 | 1/2012 | Chen et al. |

(Continued)

FOREIGN PATENT DOCUMENTS

| CN | 101674279 | 3/2010 |
| CN | 101695064 | 4/2010 |
| WO | WO2008058143 | 5/2008 |

OTHER PUBLICATIONS

International Search Report from corresponding PCT Application No. PCT/US2013/074137, dated Dec. 10, 2012 (2 pages).

(Continued)

*Primary Examiner* — Rahel Guarino
(74) *Attorney, Agent, or Firm* — John R. Pessetto; Charles A. Brill; Frank D. Cimino (57) ABSTRACT

The disclosure provides a circuit. The circuit includes an IFFT (inverse fast fourier transform) block. The IFFT block generates a modulated signal in response to a data signal. A clip logic block is coupled to the IFFT block, and generates a clipped signal in response to the modulated signal. A first subtractor is coupled to the clip logic block and the IFFT block, and subtracts the modulated signal from the clipped signal to generate an error signal. A cyclic filter is coupled to the first subtractor, and filters the error signal to generate a filtered error signal. A second subtractor is coupled to the cyclic filter and the IFFT block. The second subtractor subtracts the filtered error signal from the modulated signal to generate a processed signal.

20 Claims, 8 Drawing Sheets

(58) Field of Classification Search
CPC ............... H04L 27/263; H04L 27/2601; H04L 27/2628; H04L 27/36; H04L 5/0046; H04L 1/0042; H04L 1/0059; H04L 25/03343; H04L 27/2634; H04N 21/2383; H04W 84/12; H04B 1/0475; H04B 1/7176; H03F 2200/66; H03M 13/235

See application file for complete search history.

(56) References Cited

U.S. PATENT DOCUMENTS

| | | |
|---|---|---|
| 8,848,813 B2 | 9/2014 | Gunturi et al. |
| 9,967,123 B1* | 5/2018 | Balakrishnan ...... H04L 27/2624 |
| 2003/0202611 A1 | 10/2003 | Montojo et al. |
| 2004/0234006 A1 | 11/2004 | Leung |
| 2006/0126748 A1 | 6/2006 | Lin et al. |
| 2006/0140296 A1 | 6/2006 | Cleveland et al. |
| 2007/0195909 A1 | 8/2007 | Ishikawa et al. |
| 2008/0089439 A1 | 4/2008 | Piirrainen |
| 2009/0180574 A1 | 7/2009 | Futagi et al. |
| 2010/0097923 A1 | 4/2010 | Zhao et al. |
| 2011/0092173 A1 | 4/2011 | McCallister et al. |
| 2014/0161202 A1* | 6/2014 | Gunturi ............... H04L 27/2623 375/267 |

OTHER PUBLICATIONS

Chinese Search Report in corresponding Chinese Patent Application No. 201380056831.4, dated Dec. 4, 2017 (5 pages).

* cited by examiner

652 — PERFORM INVERSE FAST FOURIER TRANSFORM (IFFT) ON A DATA SIGNAL TO GENERATE A MODULATED SIGNAL

654 — CLIP THE MODULATED SIGNAL TO GENERATE A CLIPPED SIGNAL

656 — SUBTRACT THE CLIPPED SIGNAL FROM THE MODULATED SIGNAL TO GENERATE AN ERROR SIGNAL

658 — FILTER THE ERROR SIGNAL IN A CYCLIC FILTER TO GENERATE A FILTERED ERROR SIGNAL

660 — SUBTRACT THE FILTERED ERROR SIGNAL FROM THE MODULATED SIGNAL TO GENERATE A PROCESSED SIGNAL

PEAK-TO-AVERAGE POWER REDUCTION USING GUARD TONE FILTERING

CROSS REFERENCE TO RELATED APPLICATIONS

This application claims priority from U.S. patent application Ser. No. 15/426,464 filed on Feb. 7, 2017 which is hereby incorporated by reference in its entirety.

TECHNICAL FIELD

The present disclosure is generally related to wireless communication systems, and more particularly to reducing peak-to-average power ratio (PAR) in orthogonal frequency division multiplexed (OFDM) signals.

BACKGROUND

Power consumption is a key care-about for most battery powered devices as it determines the time between battery recharges or replacements. As wireless local area network (WLAN) gets integrated in mobile phones and also in devices for internet of things (IoT), low power consumption of WLAN is becoming a critical design requirement. WLAN system uses Orthogonal Frequency Division Multiplexed (OFDM) signals.

OFDM signals are used in many technologies including WLAN and Long Term Evolution (LTE) due to their spectral efficiency and robustness to multipath fading channels. One of the drawbacks of OFDM signals is that they have high peak-to-average power ratio (PAR). Due to high PAR, power amplifier (PA) in the transmitter would have to be operated with a large back-off leading to poor PA efficiency. Alternatively, in integrated CMOS transceivers, large PAR increases the saturation power (Psat) requirement of the PA and can significantly increase the power consumption. In handheld applications, the poor efficiency of PA drains the battery.

Existing method to reduce the PAR includes a coding scheme which requires large look up tables (LUT) to be stored in the transmitter and receiver for both encoding and decoding. However, such a coding scheme cannot be used if it is not prescribed in the WLAN or LTE standard. Other conventional methods to reduce the PAR include selective mapping, partial transmit sequences and random phasor. These methods have high complexity and also require additional side information to be sent to the receiver, and hence are standard non-compliant. Therefore, a low complexity method to reduce PAR can help reduce the transmit power consumption and increase battery life.

SUMMARY

The disclosure provides a circuit. The circuit includes an IFFT (inverse fast fourier transform) block. The IFFT block generates a modulated signal in response to a data signal. A clip logic block is coupled to the IFFT block, and generates a clipped signal in response to the modulated signal. A first subtractor is coupled to the clip logic block and the IFFT block, and subtracts the modulated signal from the clipped signal to generate an error signal. A cyclic filter is coupled to the first subtractor, and filters the error signal to generate a filtered error signal. A second subtractor is coupled to the cyclic filter and the IFFT block. The second subtractor subtracts the filtered error signal from the modulated signal to generate a processed signal.

DETAILED DESCRIPTION OF THE EMBODIMENTS

Figure 1:
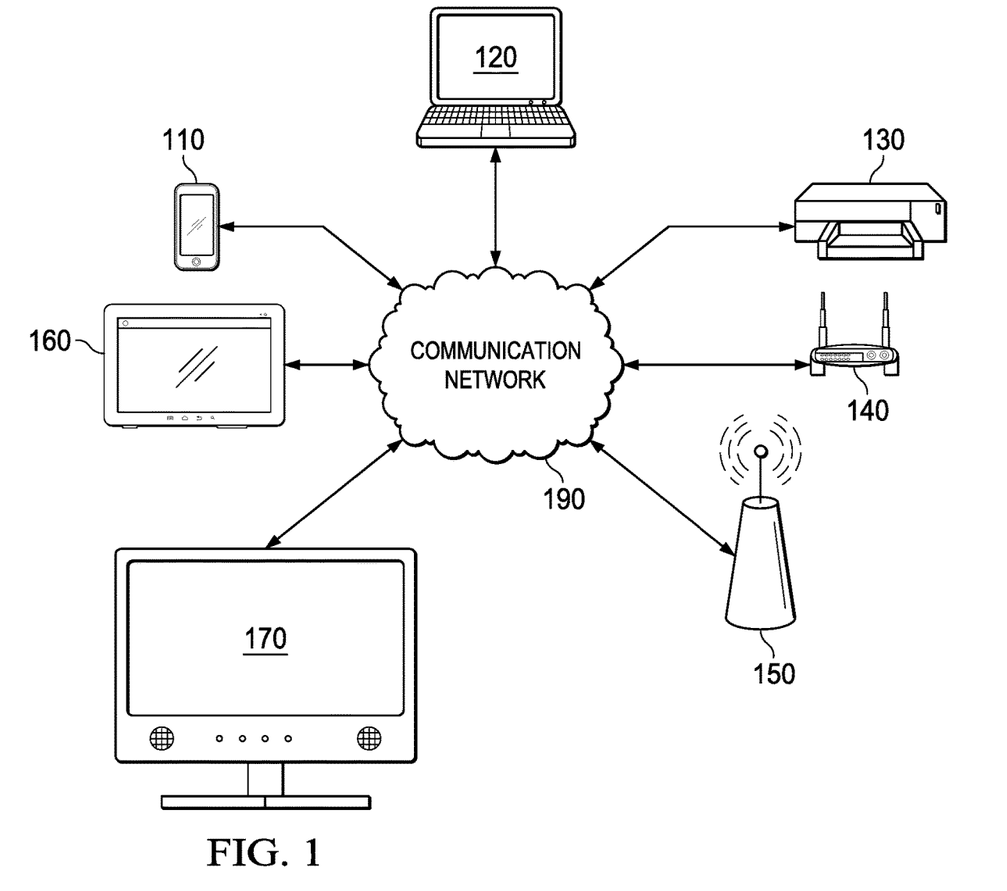
FIG. 1 is an example environment in which various aspects of the present disclosure may be implemented.

FIG. 1 is an example environment in which various aspects of the present disclosure may be implemented. Environment is shown with mobile device 110, laptop 120, network printer 130, router 140, base station 150, PDA 160 and computer 170. The devices 110-170 are connected to a communication network 190. The communication network 190 may support exchange of data in accordance with the various wireless/wire line communications standards such as, and not limited to, WLAN, WIFI, Bluetooth, dedicated RF channel, GSM, CDMA, OFDM, satellite communication, cable networking, PSTN, DSL etc. Thus, devices 110-170 transmit and receive signal carrying information by processing the signal in accordance with one or more such standards. An example sequence of signal processing that may be performed in the devices 110-170 is described in further detail below.

Figure 2:
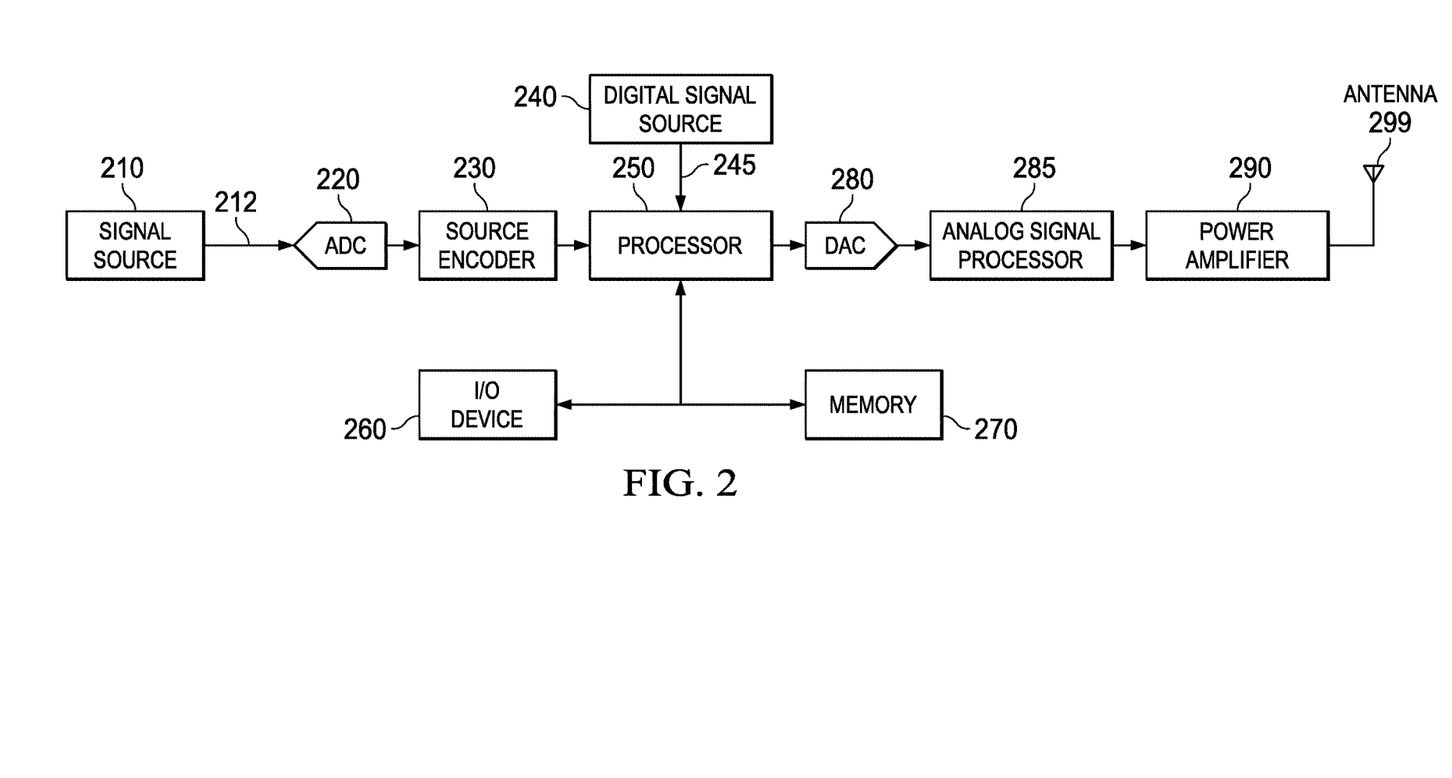
FIG. 2 is block diagram of an example data processing sequence performed within the devices of FIG. 1.

FIG. 2 is block diagram of an example data processing sequence performed within the devices of FIG. 1. The block diagram is shown containing a signal source 210, an analog to digital converter (ADC) 220, a source encoder 230, a digital signal source 240, a processor 250, an input/output (I/O) device 260, a memory 270, a digital to analog converter (DAC) 280, an analog signal processor 285, a power amplifier 290 and an antenna 299. Each block is described in further detail below.

The signal source 210 provides an analog signal on path 212 for processing and transmitting on the communication network 190 (illustrated in FIG. 1). The signal source 210 may represent any analog sources such as, but not limited to microphone providing an audio/speech signal, cameras providing video or image signal, and sensors providing temperature variations, pressure variations and other automation signals. The signal source 210 may also include other ancillary systems that acquire the signal from signal sources/sensors and converts them to suitable format for processing.

The ADC 220 converts the analog signal received from the signal source 210 to digital values. The ADC 220 may sample the received analog signal and convert each sample of the analog signal to a digital code thereby giving sequence of digital code corresponding to the continuous analog signal. The dynamic range of the ADC 220 may be selected suitably to match the dynamic range of the analog signal such that each sampled value is effectively represented by a digital code. The ADC 220 may be implemented using any known techniques.

The source encoder 230 may encode the sequence of raw digital codes received from the ADC 220 according to various source encoding standards to remove the redundancy and improve the efficiency in representing the analog value in digital format. The source encoder 230 may be implemented in consideration with the signal source 210.

The digital signal source 240 provides digital signal on path 245 for processing and transmitting over the communication network 190. The digital signal may comprise one or more of processed video signal, compressed video signals, multimedia, digital documents, data packets, data symbols formed according to one or more modulation techniques such as BPSK, QPSK, QAM, M-ary etc. The digital signal source 240 may also include other ancillary systems that acquire the signal and converts them to suitable format for processing. The I/O device 260 provides an external interface to the processor 250. The processor 250 may send and receive data through the I/O device 260. The memory 270 stores the data and provides the data when required by the processor 250 for processing.

The DAC 280 converts sequence of digital bits to corresponding analog signal. The analog signal is provided to the analog signal processor 285. The DAC 280 may be implemented using any known techniques matching the signal rate and range accuracy. The analog signal processor 285 process the analog signal received from the DAC 280 to generate a processed analog signal. The analog signal processor 285 transmits the processed analog signal over the communication network 190. The analog signal processor 285 may perform one or more operations of a filter, mixer, frequency convertor, and other RF front end operations suitable for transmitting the analog signal in accordance with the desired communication standard. The processed analog signal is provided to the power amplifier 290.

The power amplifier 290 amplifies the power of the received signal to desired transmit power level for transmission. The transmission of the signal is made through the antenna 299 or through other conductive means operative as part of the communication network 190. The power amplifier 290 may be designed to amplify a signal with a particular PAR. The efficiency of the power amplifier 290 may vary depending on the PAR of the signal being amplified. The manner in which PAR may affect the efficiency of the power amplifier 290 is described below with reference to FIG. 3.

Figure 3:
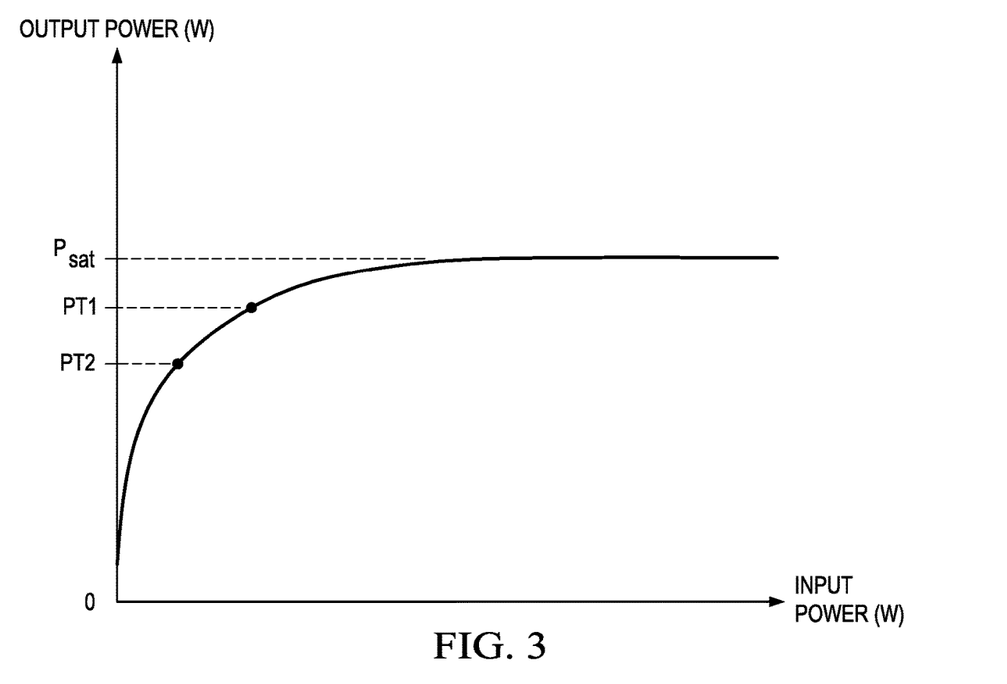
FIG. 3 illustrates an example transfer curve of a power amplifier.

FIG. 3 illustrate an example transfer curve of a power amplifier. The Psat represents the designed saturation power of the power amplifier 290. The PT1 represents the transmit power of a signal with peak-to-average power ratio PAR1. PT2 represents the transmit power of the signal with peak-to-average power ratio PAR2 that is greater than PAR1.

As can been seen, the transmit power is set to less than (referred to as "back off from") the Psat for amplifying the signal component. The amount of back off is often determined based on the signal swing or PAR. In general, higher the PAR of the signal, larger is the back off. Thus, to achieve a desired transmit power, the Psat of the power amplifier needs to be set to correspondingly higher value. The higher Psat may result in higher current consumption in the processing chain of FIG. 2. Alternatively, for a fixed Psat, the power that can be transmitted while meeting the transmitter output modulation accuracy requirements decreases with increase in PAR.

As is well known, the power amplifier consumes larger percentage of power compared to other units in the processing chain of FIG. 2. Thus, it is desirable to keep the transmit power closer to Psat by reducing the PAR of the signal being amplified.

Figure 4:
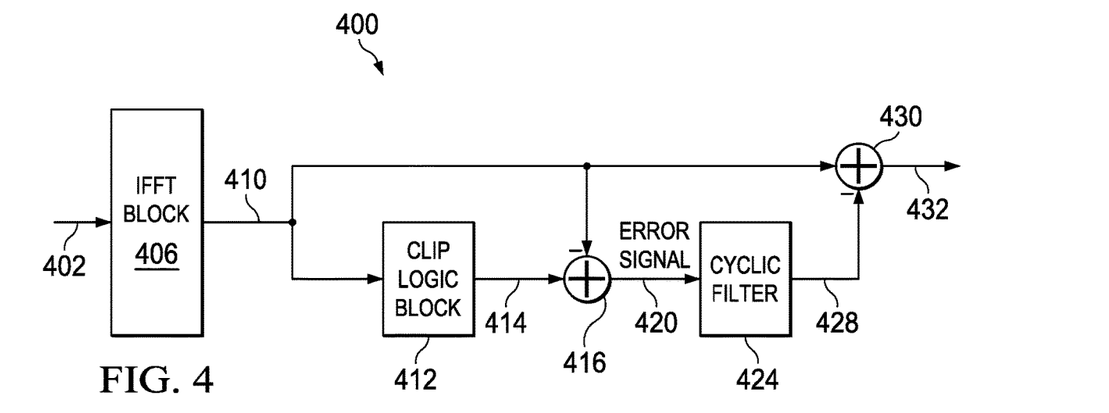
FIG. 4 illustrates a circuit, according to an embodiment.

FIG. 4 illustrate a circuit 400, according to an embodiment. The circuit 400 includes an IFFT (inverse fast fourier transform) block 406, a clip logic block 412, a first subtractor 416, a cyclic filter 424 and a second subtractor 430. The IFFT block 406 receives a data signal 402. The clip logic block 412 is coupled to the IFFT block 406. The first subtractor 416 is coupled to the clip logic block 412 and the IFFT block 406. The cyclic filter 424 is coupled to the first subtractor 416, and the second subtractor 430 is coupled to the cyclic filter 424 and the IFFT block 406. The circuit 400 may include one or more additional components known to those skilled in the relevant art and are not discussed here for simplicity of the description.

The operation of the circuit 400 is explained now. The data signal 402, in one example, is an OFDM (orthogonal frequency division multiplexed) signal. The OFDM signal includes data tone sub-carriers and guard tone sub-carriers. The data tone sub-carriers carry information bits to be transmitted, and the guard tone sub-carriers, in one version, are zeros. The IFFT block 406 processes the data signal 402 to generate a modulated signal 410.

In one version, the data signal 402 is generated in the following manner. A scrambler precedes the IFFT block 406. The information bits are passed through the scrambler to randomize the bit sequence to generate a scrambled data. The scrambled data is passed through a forward error correction (FEC) code to add redundancy to the information bits. This enables error correction in a receiver due to the noise or interference introduced by a channel. The channel is a medium used to transmit a processed signal 432 generated by the circuit 400. The FEC code, in WLAN (wireless local area network), is a convolutional code. The coded information bits thus generated are interleaved, and thereafter mapped to a constellation set like BPSK, QPSK, 16-QAM or 64-QAM. The OFDM sub-carriers are modulated with these constellation points to generate the data signal 402.

The IFFT block 406 performs inverse fast fourier transform on the data signal 402 to generate the modulated signal 410. The data signal 402 is a frequency domain signal, and the modulated signal 410 is a time domain signal. The clip logic block 412 clips the modulated signal 410 to generate a clipped signal 414. The clip logic block 412 clips the modulated signal 410 at a threshold level to generate the clipped signal 414.

The modulated signal 410, in one example, is defined by following equation:

$$x = x_r + j * x_q \quad (1)$$

where $x_r$ is the real part, and $x_q$ is the imaginary part of the modulated signal 410. An amplitude of the modulated signal 410 is defined as:

$$|x| = \mathrm{sqrt}(x_r^2 + x_q^2) \quad (2)$$

The clip logic block 412 computes the amplitude of the modulated signal 410 as defined in equation 2. The clip logic block 412 clips the modulated signal 410 according to the following equation:

$$x_{clip\_out} = \begin{cases} |x|e^{j\theta}, & \text{for } |x| <= c \\ ce^{j\theta}, & \text{for } x > c \end{cases} \quad (3)$$

where, c is the threshold level, and $x_{clip\_out}$ represents the clipped signal 414. In one example, c is a programmable threshold level.

The clip logic block 412 compares the amplitude of the modulated signal 410 at every time instant with the threshold level c. If the amplitude of the modulated signal 410 is lower than the threshold level c, an amplitude of the clipped signal 414 is same as the amplitude of the modulated signal 410. When the amplitude of the modulated signal 410 exceeds the threshold level c, then the amplitude of the clipped signal 414 is equal to threshold level c. A phase of the modulated signal 410 is not altered. Thus, a phase of the clipped signal 414 is same as the phase of the modulated signal 410 irrespective of whether the amplitude of the modulated signal 410 is clipped or not clipped.

The first subtractor 416 subtracts the modulated signal 410 from the clipped signal 414 to generate an error signal 420. Thus, the error signal 420 is a difference between the clipped signal 414 and the modulated signal 410 for every time instant. If the clipped signal 414 is represented as $x_{clip\_out}(n)$ for time instant and the modulated signal 410 is represented as $x_{IFFT\_out}(n)$, then the error signal 420 at time instant 'n' is defined as:

$$x(n) = x_{clip\_out}(n) - x_{IFFT\_out}(n) \quad (4)$$

The cyclic filter 424 receives the error signal 420, and filters the error signal 420 to generate a filtered error signal 428. In one version, the data tone sub-carriers in the data signal 402 determine a stop-band of the cyclic filter 424, and the guard tone sub-carriers in the data signal 402 determine a pass-band of the cyclic filter 424. In one example, the cyclic filter 424 is a tap delay line with the error signal 420 as an input signal. The tap delay line is multiplied with filter coefficients associated with the cyclic filter 424.

When the IFFT block 406 performs N-point inverse fast fourier transform, the cyclic filter 424 is also an N-point filter. The error signal 420 is also an N-point signal. In one example, the filter coefficients associated with the cyclic filter 424 are represented as h(0), h(1), ... h(N-1) for the N-point cyclic filter. The cyclic filter 424 performs cyclic convolution or circular convolution.

When the error signal 420 is represented as x(n), and the filter coefficients associated with the cyclic filter 424 as h(n), then the filtered error signal 428 is represented as:

$$y(n) = \Sigma_{k=0}^{N-1} h(k)x((n-k)_N) \quad (5)$$

where n=0, 1, 2 ... N-1, and $x((n-k)_N)$ denotes that the time index of x is computed modulo-N. For example, for N=128, $x(0_N)=x(0)$, $x(-1_N)=x(127)$, $x(-2_N)=x(126)$ and so on. Also, $x(1_N)=x(1)$, $x(128_N)=x(0)$, $x(129_N)=x(1)$ and so on. The filtered error signal 428 of the cyclic filter 424 for n=0, y(0) is represented as:

$$y(0) = h(0)*x(0) + h(1)*x(-1_N) + h(2)*x(-2_N) + \ldots + h(N-x(-(N-1)_N)) \quad (6)$$

Using the modulo-N definition, y(0) is represented as:

$$y(0) = h(0)*x(0) + h(1)*x(N-1) + h(2)*x(N-2) + \ldots + h(N-x(1)) \quad (7)$$

It is understood that for y(1), the error signal 420 x(n) is cyclically shifted, and y(1) is represented as:

$$y(1) = h(0)*x(1) + h(1)*x(0) + h(2)*x(N-1) + \ldots + h(N-1)*x(2) \quad (8)$$

In one version, indexing of the sequence of the data signal 402 is in a normal bit order and the indexing of the sequence of the modulated signal 410 generated by the IFFT block 406 is in a bit reversed order. Also, the clipped signal 414 is also in the bit reversed order as the clip logic block 412 performs clipping for each sample of the modulated signal 410 independent of a previous sample. As the first subtractor 416 subtracts the modulated signal 410 from the clipped signal 414, the error signal 420 thus generated is also in the bit reversed order. A mapping between the bit reversed order error signal 420 and the tap delay line configuration of the cyclic filter 424 to compute y(0) is fixed. Hence, the error signal 420 can be loaded directly in the tap delay line configuration of the cyclic filter 424. Therefore, the error signal 420 is provided to the cyclic filter 424 without reordering the error signal 420 in a buffer. This avoids the latency of 2*N clocks incurred by loading the error signal 420 into a buffer and then loading it in the required order to fill in the tap delay line configuration of the cyclic filter 424.

The cyclic filter 424 is a band-stop filter in an EVM (error vector magnitude) limited mode, and the cyclic filter is a band-pass filter in a mask limited mode. A WLAN system has many data rates and a transmitter output in each of the data rates must comply with certain standard specifications. The standard specifies the error vector magnitude (EVM) and emission spectral mask for the transmitter output. In WLAN, the data rates vary from 6 Mbps to 54 Mbps, and the different data rates have different requirements on the EVM. For example, 54 Mbps data rate has −28 dB EVM requirement and, typically, the transmitter output possible for this data rate is limited by EVM requirement. This data rate is classified as an EVM limited mode. On the other hand, the 6 Mbps data rate has a very relaxed EVM requirement and, typically, the transmitter output for this data rate is limited by spectral mask requirement. This data rate is classified as a mask limited mode.

The second subtractor 430 subtracts the filtered error signal 428 from the modulated signal 410 to generate the processed signal 432. The operation of the circuit 400 is further illustrated in connection with Table 1 represented below.

TABLE 1

| Data Signal | Modulated signal | Clipped signal | Error signal | Cyclic filter tap delay line configuration for y (0) | Cyclic filter tap delay line configuration for y (1) | Cyclic filter tap delay line configuration for y (2) |
|---|---|---|---|---|---|---|
| 0 | 0 | 0 | 0 | 0 | 1 | 2 |
| 1 | 4 | 4 | 4 | 7 | 0 | 1 |

TABLE 1-continued

| Data Signal | Modulated signal | Clipped signal | Error signal | Cyclic filter tap delay line configuration for y (0) | Cyclic filter tap delay line configuration for y (1) | Cyclic filter tap delay line configuration for y (2) |
|---|---|---|---|---|---|---|
| 2 | 2 | 2 | 2 | 6 | 7 | 0 |
| 3 | 6 | 6 | 6 | 5 | 6 | 7 |
| 4 | 1 | 1 | 1 | 4 | 5 | 6 |
| 5 | 5 | 5 | 5 | 3 | 4 | 5 |
| 6 | 3 | 3 | 3 | 2 | 3 | 4 |
| 7 | 7 | 7 | 7 | 1 | 2 | 3 |

The column 1 of the Table 1 illustrates the sequence indexing of the data signal 402 received by the IFFT block 406. The IFFT block 406 generates the modulated signal 410 in response to the data signal 402. In the example illustrated in Table 1, the data signal 402 is in a normal bit order, and the modulated signal 410 is in a bit reversed order. For example, when data signal is 1 (001), the modulated signal is 4 (100). Similarly, when the data signal is 3 (011), the modulated signal is 6 (110). Also, column 3 of Table 1 illustrates the clipped signal 414 which is also in the bit reversed order as the clip logic block 412 performs clipping for each sample of the modulated signal 410 independent of a previous sample.

As the first subtractor 416 subtracts the modulated signal 410 from the clipped signal 414, the error signal 420 thus generated is also in the bit reversed order. The error signal 420 is represented in column 4 of the Table 1. A mapping between the bit reversed order error signal 420 and the tap delay line configuration of the cyclic filter 424 to compute y(0) is fixed. Hence, the error signal 420 can be loaded directly in the tap delay line configuration of the cyclic filter 424. Therefore, the error signal 420 is provided to the cyclic filter 424 without reordering the error signal 420 in a buffer. As per equation 5, y(0) for Table 1 is defined as:

$$y(0)=h(0)*x(0)+h(1)*x(7)+h(2)*x(6)+\ldots+h(7)*x(1) \quad (9)$$

where, h(0), h(1) to h(7) are filter coefficients associated with the cyclic filter 424, and x(0), x(1) to x(7) represents the error signal 420 at different time instants.

It is understood that for y(1), the error signal 420 x(n) is cyclically shifted, and y(1) is represented as:

$$y(1)=h(0)*x(1)+h(1)*x(0)+h(2)*x(7)+\ldots+h(7)*x(2) \quad (10)$$

Thus, the error signal 420 is provided to the cyclic filter 424 without reordering the error signal 420 in a buffer. This avoids the latency of 2*N clocks incurred by loading the error signal 420 into a buffer and then loading it in the required order to fill in the tap delay line configuration of the cyclic filter 424.

The circuit 400 provides a low complexity method to reduce peak-to-average power (PAR) as compared to conventional methods. The circuit 400 is a simple circuitry that does not require additional side information to be sent to the receiver. This ensures IEEE compliance of a transmitter that includes circuit 400. The circuit 400 uses a non-iterative method, and hence enables a low latency and low power implementation. The circuit 400 complies with transmitter EVM or spectral mask performance. The circuit 400 provides reduction in the peak-to-average power ratio (PAR) of an OFDM signal to enable low power solutions for next generation IoT devices and mobile phones.

Figure 5:
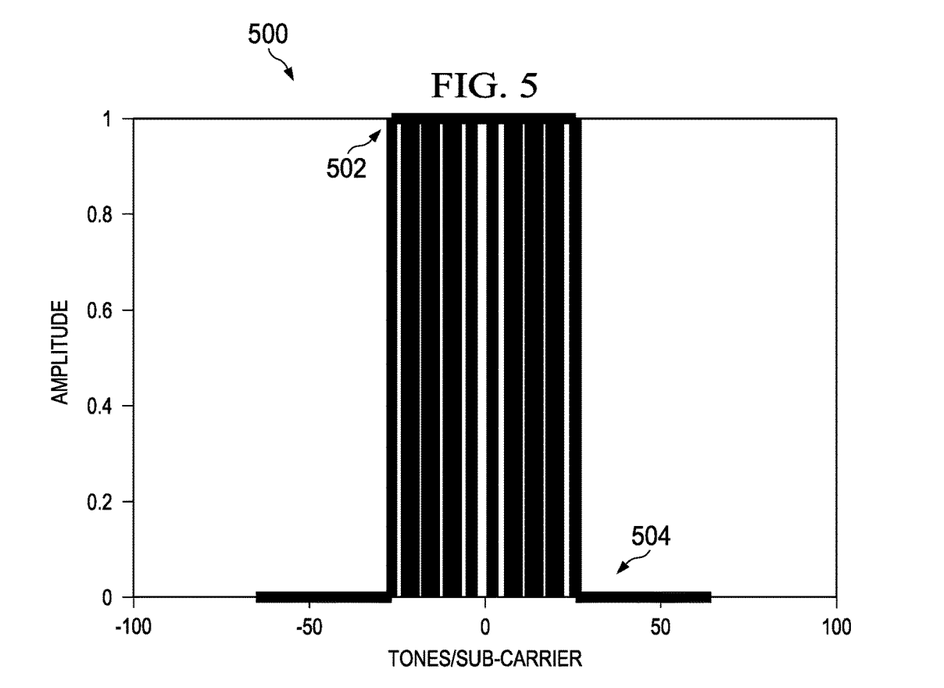
FIG. 5 illustrates a graph of a data signal, according to an embodiment.

FIG. 5 illustrates a graph of a data signal 500, according to an embodiment. The data signal 500 is similar to the data signal 402 illustrated in FIG. 4. The data signal 500, in one example, is an OFDM (orthogonal frequency division multiplexed) signal. The data signal 500 includes data tone sub-carriers 502 and guard tone sub-carriers 504. The data tone sub-carriers 502 carry information bits to be transmitted, and the guard tone sub-carriers 504 are illustrated as zeros.

Figure 6:
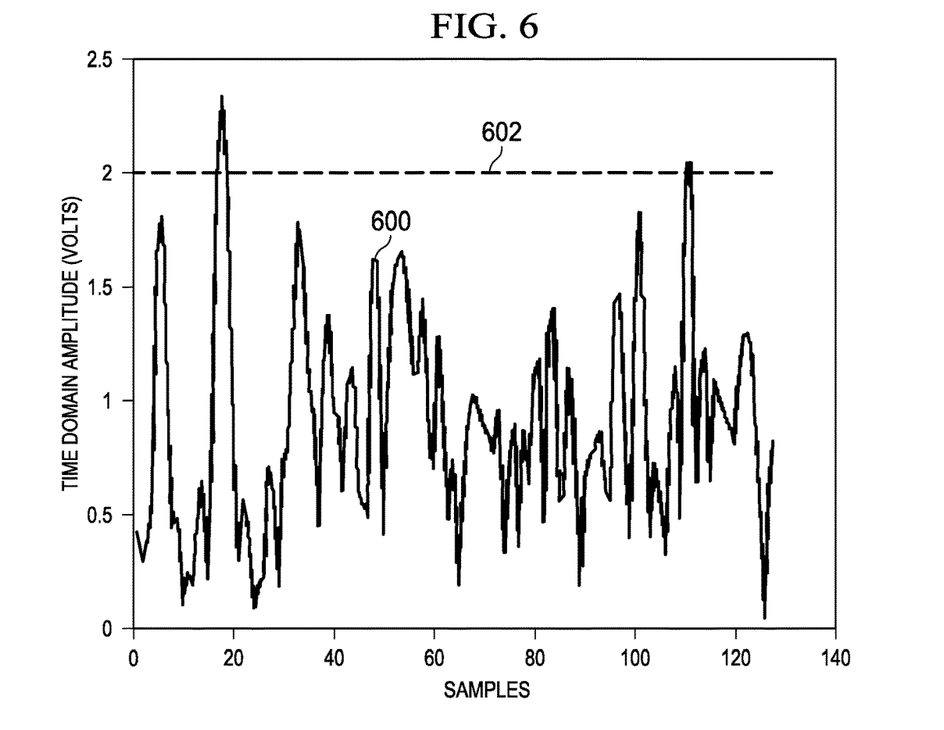
FIG. 6 illustrates a graph of a modulated signal, according to an embodiment.

FIG. 6 illustrates a graph of a modulated signal 600, according to an embodiment. The modulated signal 600 is similar to the modulated signal 410 illustrated in FIG. 4. The IFFT block 406 in the circuit 400 receives the data signal 500 (illustrated in FIG. 5), and generates the modulated signal 600.

In one version, the data signal 402 is generated in the following manner. A scrambler precedes the IFFT block 406. The information bits are passed through the scrambler to randomize the bit sequence to generate a scrambled data. The scrambled data is passed through a forward error correction (FEC) code to add redundancy to the information bits. This enables error correction in a receiver due to the noise or interference introduced by a channel. The channel is a medium used to transmit the processed signal 432 generated by the circuit 400.

The FEC code, in WLAN (wireless local area network), is a convolutional code. The coded information bits thus generated are interleaved, and thereafter mapped to a constellation set like BPSK, QPSK, 16-QAM or 64-QAM. The OFDM sub-carriers are modulated with these constellation points to generate the data signal 500. The IFFT block 406 performs inverse fast fourier transform on the data signal 500 to generate the modulated signal 600. The data signal 500 is a frequency domain signal, and the modulated signal 600 is a time domain signal. 602 represent the threshold level used by the clip logic block 412.

Figure 7:
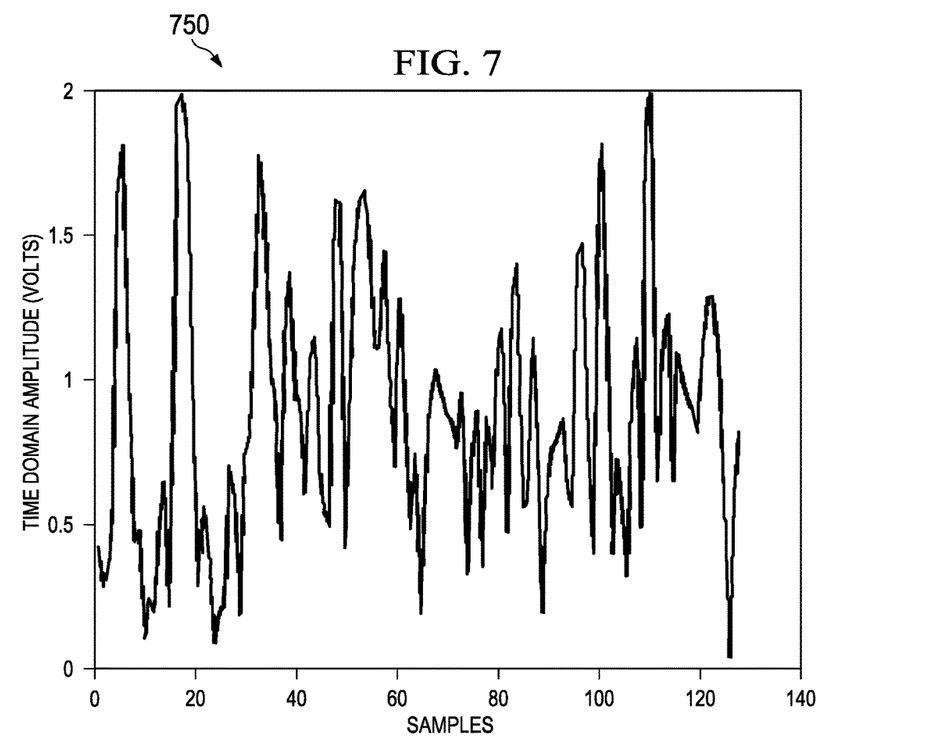
FIG. 7 illustrates a graph of a clipped signal, according to an embodiment.

FIG. 7 illustrates a graph of a clipped signal 750, according to an embodiment. The clipped signal 750 is similar to the clipped signal 414 illustrated in FIG. 4. The clip logic block 412 (illustrated in FIG. 4) receives the modulated signal 600, and clips the modulated signal 600 to generate the clipped signal 750. The clip logic block 412 clips the modulated signal 600 at the threshold level 602 to generate the clipped signal 750.

The clip logic block 412 compares the amplitude of the modulated signal 600 at every time instant with the threshold level 602. If the amplitude of the modulated signal 600 is lower than the threshold level 602, an amplitude of the clipped signal 750 is same as the amplitude of the modulated signal 600. When the amplitude of the modulated signal 600 exceeds the threshold level 602, then the amplitude of the clipped signal 750 is equal to the threshold level 602 as illustrated in FIG. 7.

Figure 8:
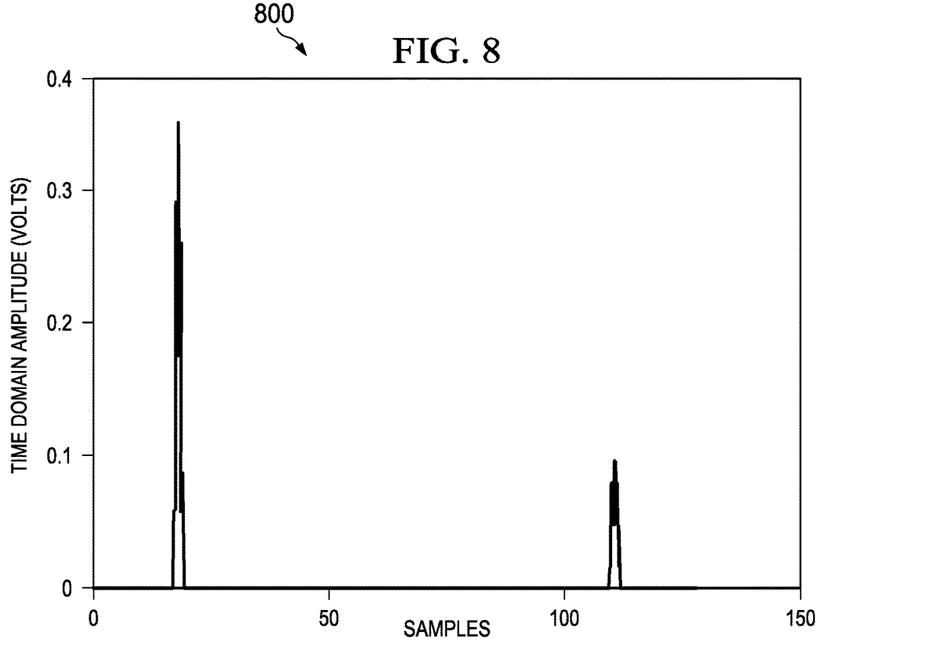
FIG. 8 illustrates a graph of an error signal, according to an embodiment.

FIG. 8 illustrates a graph of an error signal 800, according to an embodiment. The error signal 800 is similar to the error signal 420 illustrated in FIG. 4. The first subtractor 416 subtracts the modulated signal 600 from the clipped signal 750 to generate the error signal 800. Thus, the error signal 800 is a difference between the clipped signal 750 and the modulated signal 600 for every time instant.

Figure 9:
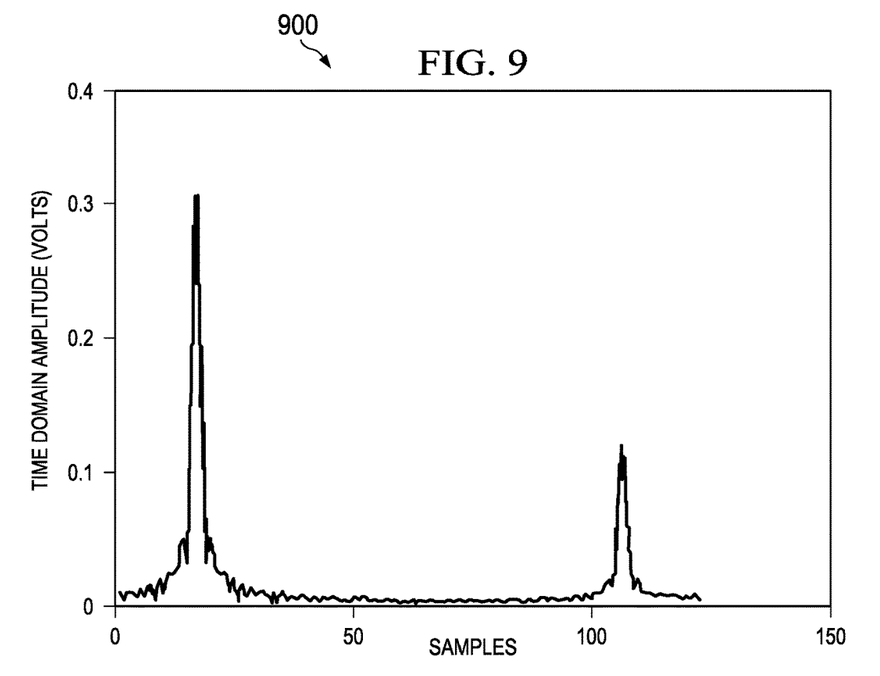
FIG. 9 illustrates a graph of a filtered error signal, according to an embodiment.

FIG. 9 illustrates a graph of a filtered error signal 900, according to an embodiment. The filtered error signal 900 is similar to the filtered error signal 428 illustrated in FIG. 4. The cyclic filter 424 receives the error signal 800, and filters the error signal 800 to generate the filtered error signal 900. In one example, the cyclic filter 424 is a tap delay line with the error signal 800 as an input signal.

The tap delay line is multiplied with filter coefficients associated with the cyclic filter 424. The cyclic filter 424 performs cyclic convolution or circular convolution of the error signal 800 and the filter coefficients associated with the cyclic filter 424. The error signal 800 can be loaded directly in the tap delay line configuration of the cyclic filter 424. Therefore, the error signal 800 is provided to the cyclic filter 424 without reordering the error signal 800 in a buffer.

Figure 10:
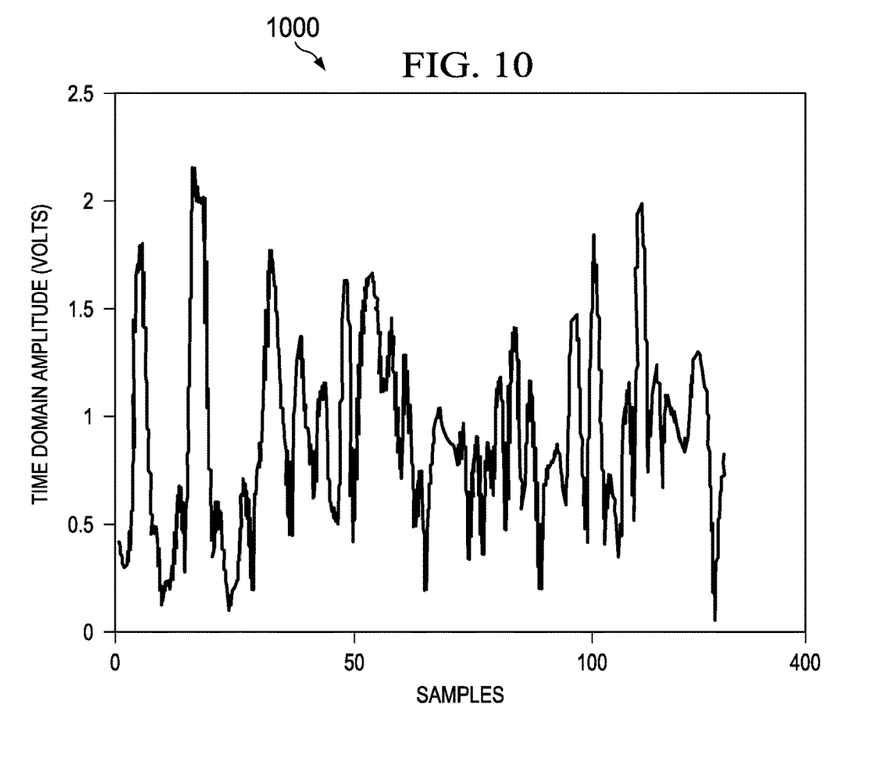
FIG. 10 illustrates a graph of a processed signal, according to an embodiment.

FIG. 10 illustrates a graph of a processed signal 1000, according to an embodiment. The processed signal 1000 is similar to the processed signal 432 illustrated in FIG. 4. The second subtractor 430 subtracts the filtered error signal 900 from the modulated signal 600 to generate the processed signal 1000.

Figure 11:
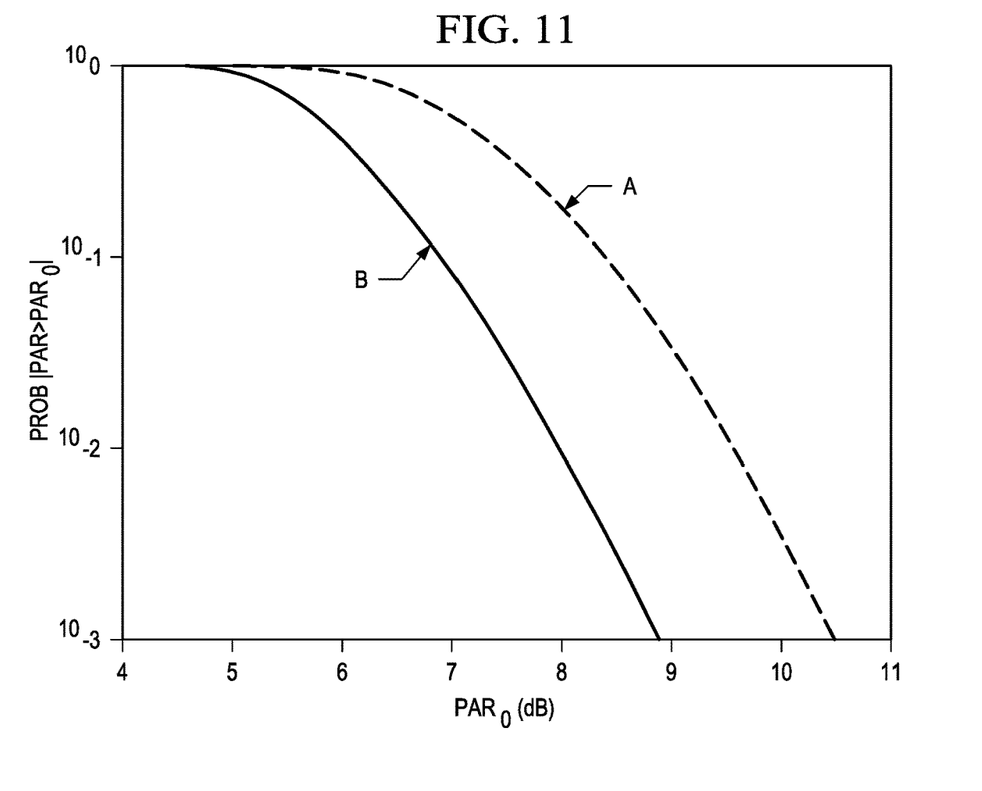
FIG. 11 illustrates a graph of PAR (peak-to-average power) reduction, according to an embodiment.

FIG. 11 illustrates a graph of PAR (peak-to-average power) reduction, according to an embodiment. By using conventional methods, the PAR of the OFDM signal is greater than 10.5 dB with probability approximately 0.001 as illustrated by curve A. This means that with probability of 0.999, the PAR of the OFDM signal illustrated by curve A is less than 10.5 dB. By using the circuit 400, the probability that the PAR of the OFDM signal is greater than 9 dB is 0.001. This implies that, using circuit 400, with probability of 0.999, the PAR of the OFDN signal illustrated by curve B is less than 9 dB. The probability that the PAR of the OFDM signal (illustrated in curve A) is greater than 8 dB is approximately 0.2, while the probability of the OFDM signal (illustrated in curve B) is greater than 8 dB is approximately 0.01. Thus, a significant PAR reduction is achieved using the circuit 400.

Figure 12:
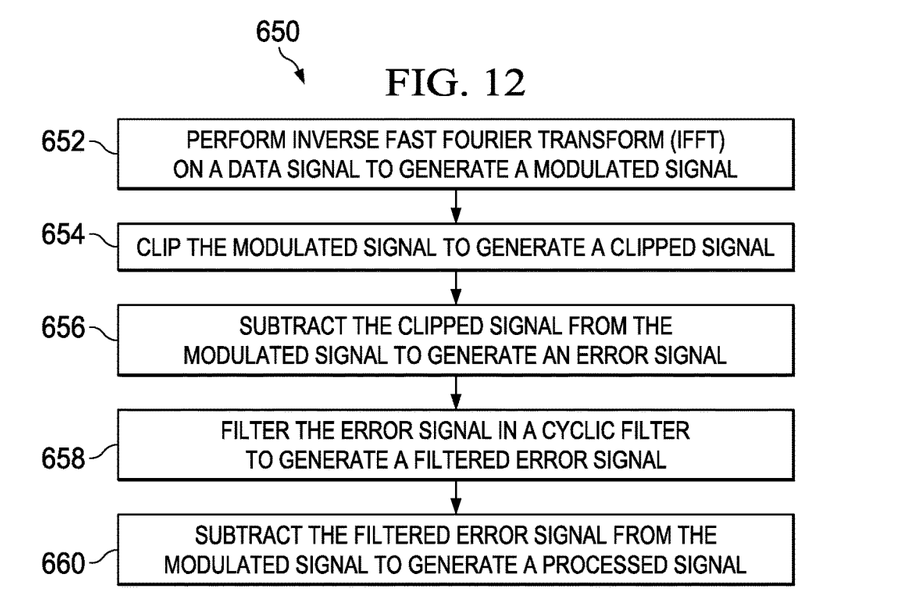
FIG. 12 is a flowchart to illustrate a method of operation of a circuit, according to an embodiment.

FIG. 12 is a flowchart 650 to illustrate a method of operation of a circuit, according to an embodiment. The flowchart 650 is explained in connection with the circuit 400 illustrated in FIG. 4. At step 652, inverse fast fourier transform is performed on a data signal to generate a modulated signal. In the circuit 400, the IFFT block 406 performs inverse fast fourier transform on the data signal 402 to generate the modulated signal 410.

The data signal, in one example, is an OFDM (orthogonal frequency division multiplexed) signal. The OFDM signal includes data tone sub-carriers and guard tone sub-carriers. The data tone sub-carriers carry information bits to be transmitted, and the guard tone sub-carriers, in one version, are zeros. The data signal is a frequency domain signal, and the modulated signal is a time domain signal.

The modulated signal is clipped to generate a clipped signal, at step 654. The clip logic block 412, in the circuit 400, clips the modulated signal 410 to generate the clipped signal 414. The clip logic block 412 clips the modulated signal 410 at a threshold level to generate the clipped signal 414.

The amplitude of the modulated signal at every time instant is compared with the threshold level c. If the amplitude of the modulated signal is lower than the threshold level c, an amplitude of the clipped signal is same as the amplitude of the modulated signal. When the amplitude of the modulated signal exceeds the threshold level c, then the amplitude of the clipped signal is equal to threshold level c. A phase of the modulated signal is not altered. Thus, a phase of the clipped signal is same as the phase of the modulated signal irrespective of whether the amplitude of the modulated signal is clipped or not clipped.

At step 656, the clipped signal is subtracted from the modulated signal to generate an error signal. The error signal is a difference between the clipped signal and the modulated signal for every time instant. In the circuit 400, the first subtractor 416 subtracts the modulated signal 410 from the clipped signal 414 to generate the error signal 420.

At step 658, the error signal is filtered in a cyclic filter to generate a filtered error signal. In the circuit 400, the cyclic filter 424 receives the error signal 420, and filters the error signal 420 to generate the filtered error signal 428. In one example, the cyclic filter 424 is a tap delay line with the error signal 420 as an input signal.

The tap delay line is multiplied with filter coefficients associated with the cyclic filter 424. The cyclic filter 424 performs cyclic convolution or circular convolution of the error signal and the filter coefficients associated with the cyclic filter 424. The error signal can be loaded directly in the tap delay line configuration of the cyclic filter 424. Therefore, the error signal is provided to the cyclic filter 424 without reordering the error signal in a buffer.

At step 660, the filtered error signal is subtracted from the modulated signal to generate a processed signal. In the circuit 400, the second subtractor 430 subtracts the filtered error signal 428 from the modulated signal 410 to generate the processed signal 432.

The method illustrated by the flowchart 650 provides a low complexity method to reduce peak-to-average power (PAR) as compared to conventional methods. The method does not require additional side information to be sent to the receiver. This ensures IEEE compliance of a transmitter that uses this method. It is a non-iterative method, and hence enables a low latency and low power implementation. The method complies with transmitter EVM and spectral mask performance. The method also provides reduction in the peak-to-average power ratio (PAR) of an OFDM signal to enable low power solutions for next generation IoT devices and mobile phones.

Figure 13:
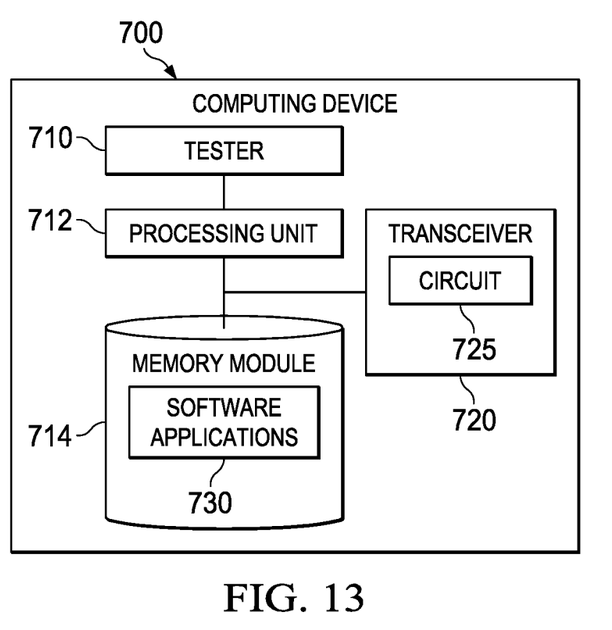
FIG. 13 illustrate a computing device, according to an embodiment.

FIG. 13 illustrates a computing device 700, according to an embodiment. The computing device 700 is, or is incorporated into, a mobile communication device, such as a mobile phone, a personal digital assistant, a transceiver, a personal computer, or any other type of electronic system. The computing device 700 may include one or more additional components known to those skilled in the relevant art and are not discussed here for simplicity of the description.

In some embodiments, the computing device 700 comprises a megacell or a system-on-chip (SoC) which includes a processing unit 712 such as a CPU (Central Processing Unit), a memory module 714 (e.g., random access memory (RAM)) and a tester 710. The processing unit 712 can be, for example, a CISC-type (Complex Instruction Set Computer) CPU, RISC-type CPU (Reduced Instruction Set Computer), or a digital signal processor (DSP).

The memory module 714 (which can be memory such as RAM, flash memory, or disk storage) stores one or more software applications 730 (e.g., embedded applications) that, when executed by the processing unit 712, performs any suitable function associated with the computing device 700. The tester 710 comprises logic that supports testing and debugging of the computing device 700 executing the software applications 730.

For example, the tester 710 can be used to emulate a defective or unavailable component(s) of the computing device 700 to allow verification of how the component(s), were it actually present on the computing device 700, would perform in various situations (e.g., how the component(s) would interact with the software applications 730). In this way, the software applications 730 can be debugged in an environment which resembles post-production operation.

The processing unit 712 typically comprises memory and logic which store information frequently accessed from the memory module 714. The computing device 700 includes a transceiver 720. The transceiver 720 includes a circuit 725. The circuit 725 is similar in connection and operation to the circuit 400. The circuit 725 includes an IFFT (inverse fast fourier transform) block, a clip logic block, a first subtractor, a cyclic filter and a second subtractor.

The circuit 725 requires less peak-to-average power (PAR) as compared to conventional methods. The circuit 725 is a simple circuitry that does not require additional side information to be sent to the receiver. This ensures IEEE compliance of a transmitter that includes circuit 725. The circuit 725 uses a non-iterative method, and hence enables a low latency and low power implementation. The circuit 725 complies with transmitter EVM and spectral mask performance. The circuit 725 provides reduction in the peak-to-average power ratio (PAR) of an OFDM signal to enable low power solutions for next generation IoT devices and mobile phones.

Modifications are possible in the described embodiments, and other embodiments are possible, within the scope of the claims.

What is claimed is:

1. A circuit comprising:
   an IFFT (inverse fast fourier transform) block configured to generate a modulated signal in response to a data signal;
   a clip logic block coupled to the IFFT block, and configured to generate a clipped signal in response to the modulated signal; and
   a second subtractor coupled to the IFFT block and configured to generate a processed signal in response to the modulated signal and the clipped signal, a peak-to-average power ratio (PAR) of the processed signal is less than a PAR of the data signal.

2. The circuit of claim 1 further comprising:
   a first subtractor coupled to the clip logic block and the IFFT block, and configured to subtract the modulated signal from the clipped signal to generate an error signal; and
   a cyclic filter coupled to the first subtractor, and configured to filter the error signal to generate a filtered error signal, wherein the filtered error signal is subtracted from the modulated signal by the second subtractor to generate the processed signal.

3. The circuit of claim 1, wherein the data signal is an OFDM (orthogonal frequency division multiplexed) signal, the OFDM signal further comprising data tone sub-carriers and guard tone sub-carriers.

4. The circuit of claim 3, wherein the data tone sub-carriers determine a stop-band of the cyclic filter, and the guard tone sub-carriers determine a pass-band of the cyclic filter.

5. The circuit of claim 1, wherein the clip logic block is configured to clip the modulated signal at a threshold level to generate the clipped signal.

6. The circuit of claim 2, wherein the cyclic filter is a tap delay line, and configured to perform cyclic convolution of the error signal and filter coefficients associated with the cyclic filter.

7. The circuit of claim 2, wherein the cyclic filter is a band-stop filter in EVM (error vector magnitude) limited mode, and the cyclic filter is a band-pass filter in mask limited mode.

8. The circuit of claim 2, wherein the error signal is provided to the cyclic filter without reordering the error signal in a buffer.

9. A method comprising:
   performing inverse fast fourier transform (IFFT) on a data signal to generate a modulated signal;
   clipping the modulated signal to generate a clipped signal; and
   generating a processed signal from the modulated signal and the clipped signal, a peak-to-average power ratio (PAR) of the processed signal is less than a PAR of the data signal.

10. The method of claim 9, wherein generating the processed signal further comprises:
    subtracting the modulated signal from the clipped signal to generate an error signal;
    filtering the error signal in a cyclic filter to generate a filtered error signal; and
    subtracting the filtered error signal from the modulated signal.

11. The method of claim 9, wherein the data signal is an OFDM (orthogonal frequency division multiplexed) signal, the OFDM signal further comprising data tone sub-carriers and guard tone sub-carriers.

12. The method of claim 10 further comprising determining a stop-band of the cyclic filter from the data tone sub-carriers, and determining a pass-band of the cyclic filter from the guard tone sub-carriers.

13. The method of claim 9, wherein clipping the modulated signal further comprises clipping at a threshold level to generate the clipped signal.

14. The method of claim 10, wherein filtering the error signal further comprises performing cyclic convolution of the error signal and filter coefficients associated with the cyclic filter.

15. The method of claim 10 further comprising providing the error signal to the cyclic filter without reordering the error signal in a buffer.

16. A computing device comprising:
    a processing unit;
    a memory module coupled to the processing unit; and
    a transceiver coupled to the processing unit and the memory module, the transceiver includes a circuit, the circuit further comprising:
    an IFFT (inverse fast fourier transform) block configured to generate a modulated signal in response to a data signal;
    a clip logic block coupled to the IFFT block, and configured to generate a clipped signal in response to the modulated signal; and
    a second subtractor coupled to the IFFT block and configured to generate a processed signal in response to the modulated signal and the clipped signal, a peak-to-average power ratio (PAR) of the processed signal is less than a PAR of the data signal.

17. The computing device of claim 16 further comprising:
a first subtractor coupled to the clip logic block and the IFFT block, and configured to subtract the modulated signal from the clipped signal to generate an error signal; and
a cyclic filter coupled to the first subtractor, and configured to filter the error signal to generate a filtered error signal, wherein the filtered error signal is subtracted from the modulated signal by the second subtractor to generate the processed signal.

18. The computing device of claim 16, wherein the data signal is an OFDM (orthogonal frequency division multiplexed) signal, the OFDM signal further comprising data tone sub-carriers and guard tone sub-carriers.

19. The computing device of claim 18, wherein the data tone sub-carriers determine a stop-band of the cyclic filter, and the guard tone sub-carriers determine a pass-band of the cyclic filter.

20. The computing device of claim 17, wherein the error signal is provided to the cyclic filter without reordering the error signal in a buffer.

\* \* \* \* \*